Dec. 1, 1931.  N. E. BONN  1,834,267
SPEED CONTROL SYSTEM
Filed June 3, 1926   3 Sheets-Sheet 1

INVENTOR
Norman E. Bonn
BY Cornelius A. Ehret
his ATTORNEY

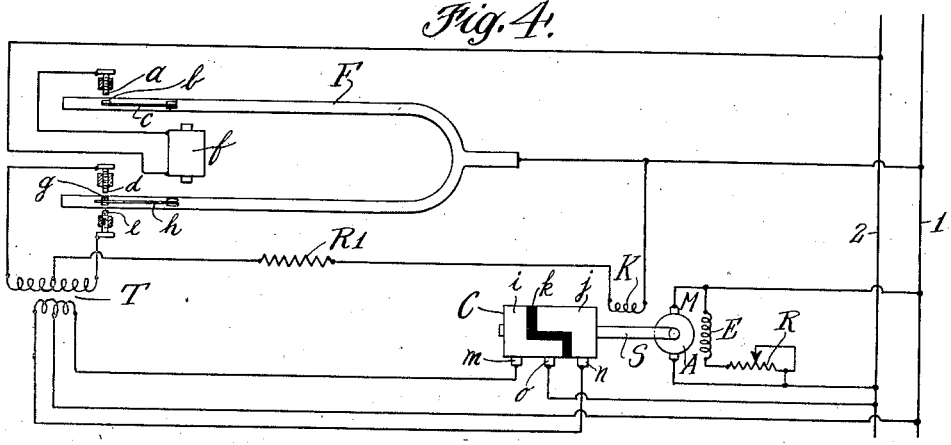
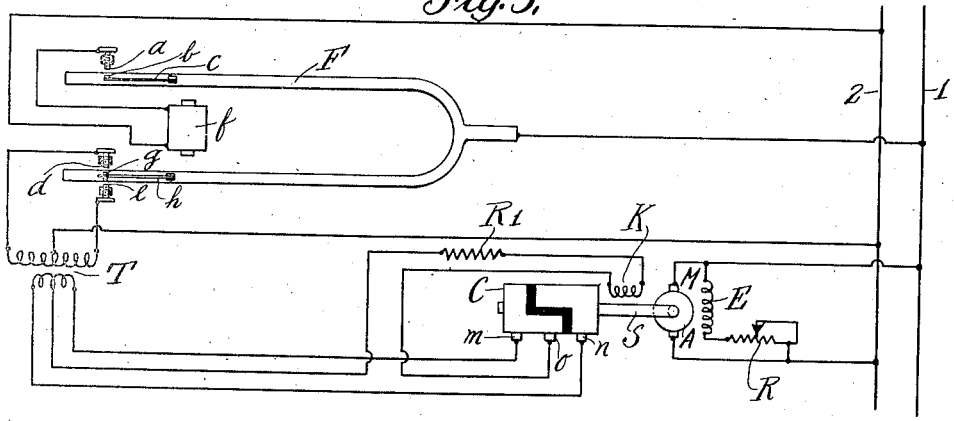
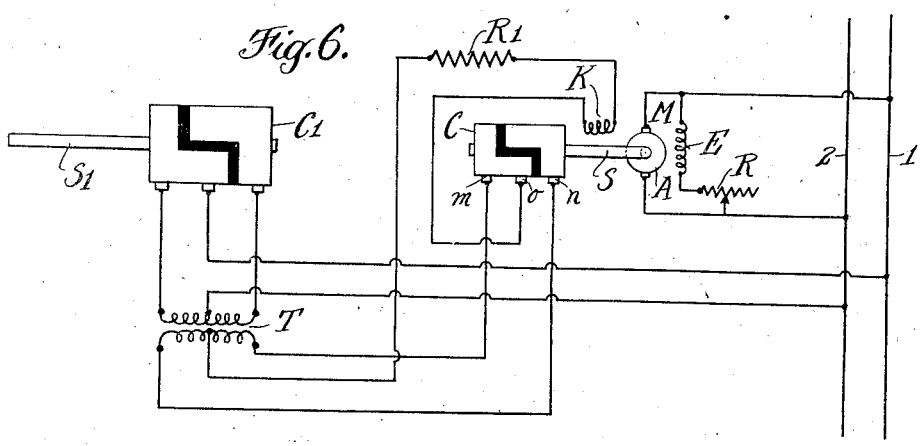

Dec. 1, 1931.  N. E. BONN  1,834,267
SPEED CONTROL SYSTEM
Filed June 3, 1926   3 Sheets-Sheet 3

INVENTOR
Norman E. Bonn
BY Cornelius A. Ehret
his ATTORNEY

Patented Dec. 1, 1931

1,834,267

UNITED STATES PATENT OFFICE

NORMAN E. BONN, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

SPEED CONTROL SYSTEM

Application filed June 3, 1926. Serial No. 113,443.

My invention relates to a method of and apparatus for controlling the speed, as the speed of rotation, of any member or system, as a shaft, motor or the like, by causing the speed to remain constant or to change to predetermined extents; for effecting synchronism betwen a motor, generator, rotating shaft, or the like, and the frequency of vibration of a mechanical or electrical vibratory system; and for effecting synchronism between two machines, rotating shafts, or the like, and, more particularly, when driven and controlled independently of each other.

In accordance with my invention the speed is controlled by or in accordance with the magnitude or changes in magnitude of a control current which is dependent upon the speed to be controlled and additionally upon a standard, reference or control velocity, such as the frequency of vibration of a mechanically or electrically vibrating system, the frequency of a fluctuating or alternating current or electro-motive-force, or the like.

More particularly in accordance with my invention, the magnitude of the control current, and particularly its average value or amplitude, is dependent on the phase difference between an alternating or fluctuating current, whose frequency depends upon the speed to be controlled, and the mechanical or electrical vibrations or oscillations representative of the control velocity.

In accordance with my invention the magnitude of the control current, or its average value, is dependent upon the phase difference between an alternating or fluctuating current whose frequency is dependent upon the control velocity, and the speed or velocity of the system whose speed is to be controlled.

In accordance with my invention, an alternating current whose frequency is dependent upon the speed to be controlled is rectified at a frequency dependent upon or representing the control velocity; or an alternating current whose frequency depends upon the control velocity is rectified at a frequency dependent upon or representing the speed to be controlled; and the rectified or uni-directional current is utilized as a control current whose magnitude depends upon the tendency of the two speeds to depart from the state of synchronism or from predetermined relation or ratio to each other.

More particularly in accordance with my invention, an alternating current, whose frequency is dependent upon the speed to be controlled, is rectified and the rectified or uni-directional current is utilized as a control current whose magnitude depends upon the standard or control velocity; and more particularly, the rectification of the alternating current is controlled at a frequency dependent upon or representing the control or standard velocity.

More particularly in accordance with my invention, the control velocity may be the frequency of vibration of a tuning fork, reed, or the like, effecting or controlling a fluctuating or alternating current whose frequency represents the frequency of vibration of the tuning fork, or the like; and further in accordance with my invention, the control current may be utilized for affecting the excitation of the field of a dynamo electric machine, such as a motor, generator, motor generator, rotary converter, or the like.

My invention resides in the method and apparatus of the character herein described and claimed.

For an understanding of my method and for an illustration of some of the various forms my system or apparatus may take, reference is had to the accompanying drawings in which:

Figs. 3, 4, 5, 6, 7 and 8 are diagrammatic views of various modifications of my system comprehending my invention.

Figure 1:
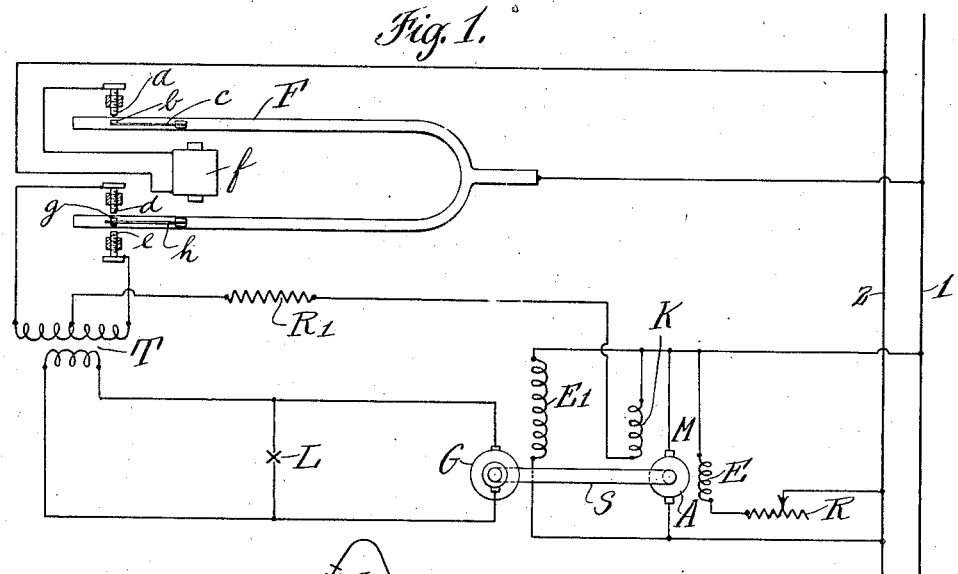
Fig. 1 is a diagrammatic view of a system embodying my invention.

Referring to Fig. 1, S generically represents any rotating shaft, member or system whose speed is to be controlled or whose synchronism with a control frequency is to be maintained. It may drive, actuate or control a load, system, device or apparatus of any character for any purpose.

In the example illustrated, S is the shaft or driven member of an electric motor M, comprising the armature A, connected across the direct current supply conductors 1 and 2, and the shunt field winding E connected across the supply conductors through the rheostat R. A starting rheostat, not shown, may be utilized in the armature circuit for starting.

G represents generically a generator of fluctuating or alternating electro-motive-force, such as a separate generator driven by the motor M, the alternating current end of a rotary converter, motor generator, or the like, comprising the motor M. When G is a generator with a separate field, the latter may be excited by field winding E1. The generator G may supply current, in addition to that utilized for control purposes, for any load, such as the electrical load L; and shaft S may drive any mechanical load.

The control velocity or frequency may be that of or representing any mechanically or electrically vibrating system, whose frequency, whether constant or varying, is the standard or reference frequency upon which the magnitude of the control current depends.

In the example illustrated in Fig. 1, there is utilized a mechanically vibrating member F, such as a tuning fork, reed, or equivalent, having its own natural period of vibration which is substantially constant. It is maintained in vibration by any suitable means such, for example, as the well-known means comprising an electro-magnet $f$ energized by current from any suitable source, such as the supply circuit 1, 2, and the contacts $a$ and $b$ in circuit with the winding of the magnet $f$, one of which, $b$, vibrates with the fork F upon which it is resiliently mounted, as upon a spring $c$.

Alternating control current is supplied by the generator or equivalent means G to the primary of a transformer T, the opposite terminals of whose secondary are connected, respectively, to the fixed contacts $d$ and $e$ alternately engaged by the contact $g$ resiliently mounted upon the fork F, as upon the spring $h$.

Associated with the motor M, or other dynamo electric machine, is an auxiliary field winding K, one of whose terminals is, in effect, connected to the contact $g$ and whose other terminal is connected (preferably through a noninductive resistance R1 of magnitude to effect small time constant of the circuit of K to cause instantaneous response and prevent hunting) with a midpoint of the secondary of the transformer T.

The speed of the shaft or system S may be varied or tend to vary from various causes. In the example illustrated, where the system is driven by the motor M, the speed may vary for such causes as changes in supply circuit voltage, temperature of the field system of the motor M, or the load upon the shaft S or generator G.

When the frequency of the current or electro-motive-force of the generator G and the frequency of vibration of the fork F are equal, that is, when the speed of the shaft or system S corresponds with the standard or control velocity or frequency, there obtains in the circuit of the winding K a uni-directional pulsating current, resulting from the rectification, by the fork-controlled contacts $d$, $e$, $g$, of the current induced in the secondary of the transformer T by the alternating current from the generator G, and whose average value is that effecting, with the winding E, that degree of field excitation essential to that speed.

Figure 2:
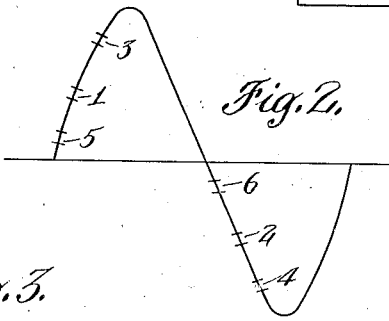
Fig. 2 is an explanatory graph of an alternating current.

The average strength or amplitude of the uni-directional or rectified current, to wit, the control current, traversing the winding K, for a given voltage of the generator G and for given durations of engagement between the contact $g$ and contacts $d$ and $e$, will depend upon the phase relation between the vibrations of the fork and of the alternating current from the generator G. This is apparent upon reference to Fig. 2 which is a graph of one complete cycle of an alternating current or electro-motive-force. The fork contract $g$ may be in engagement with contacts $d$ and $e$ during such fractions of the alternating current cycle as indicated, for example, between the pairs of points 1, 3 or 5, in the positive half wave, and 2, 4 or 6 in the negative half wave. The time position of engagement of a pair of these contacts depends upon the phase relation between the fork vibrations and the current or electro-motive-force of the generator G. The average amplitude or value of the uni-directional current in the circuit of the winding K, or the efficiency of the rectification, is much higher with the fork controlled contacts engaging during the intervals 3 and 4 than during the intervals 1 and 2.

The speed of a direct current motor, such as M, varies inversely with the strength of its field, and, accordingly, the speed of the motor M will depend upon the average amplitude or strength of the current through the control field winding K. Assuming, by way of example, that at the desired or critical speed of the shaft or system S, or for synchronism between that system and the fork F, the fork contact $g$ engages with the contacts $d$ and $e$ for intervals represented by and at the positions of 1 and 2, then, upon tendency of the motor M or the system S to change its speed, the times of engagement of the fork-controlled contacts will be displaced from the time positions of intervals 1 and 2. If the motor M or shaft S should increase in speed, the engagements of the contacts will occur at such time as indicated at 3 and 4, with the result that the average magnitude of the current through the winding K will increase, increasing the strength of the field of the motor M, causing its speed to decrease. Or, upon tendency of the motor M or system S to decrease in speed, the periods of engagement of the fork-controlled contacts will be at some other time positions, such as indicated, for example, at 5 and 6, causing decrease in the average strength of the control current, decreasing the strength of the motor field, and causing its speed to increase. In operation such changes in strength of the field of the motor M will just counteract the tendency of the motor speed to change, and, in consequence the desired or critical speed or synchronism is restored or maintained.

In the system of Fig. 1 the rotating system may be utilized to deliver either mechanical or electrical power, or both, at constant frequency or speed. For example, any suitable mechanical load may be driven by the motor M or shaft S, and any electrical load may be driven by the generator G.

Figure 3:
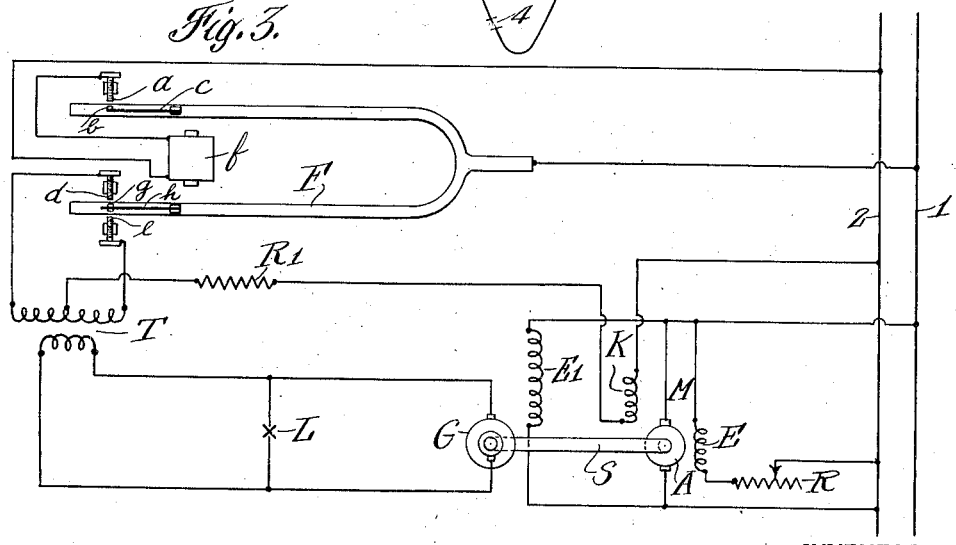

In Fig. 3 the arrangement is generally similar to that of Fig. 1. In Fig. 1 the control current traversing the winding K is derived entirely from the generator G and its magnitude is determined by interruption or control of the circuit of the winding K by the fork-controlled contacts $g$, $d$ and $e$. In the arrangement of Fig. 3, however, the control current is derived from or dependent upon the two sources 1, 2 and G.

In this case the winding K is connected in circuit with the source represented by the supply conductors 1, 2 and the fork-controlled contacts $g$, $d$ and $e$. When the source 1, 2 supplies direct current, that current through the winding G is interrupted or controlled by the fork-controlled contacts yielding a control current comprising uni-directional impulses which are controlled or modified, however, by the alternating current from generator G in the primary of the transformer T. In effect, in the circuit of the winding K, there are two superposed components, one of them uni-directional impulses of constant strength from the source 1, 2, and the other a pulsating current subject to change both in direction and magnitude.

In general the operation of the system of Fig. 3 is the same as that of Fig. 1, in that, upon tendency of the system to increase in speed, the average value of the control current in the winding K increases, and vice versa; and, as a result, the speed or synchronism of the system is restored or maintained.

In Fig. 4 the same general principles are involved. In this case a commutator C is driven by the motor M or shaft S and comprises conducting sections, of any suitable number, such as $i$ and $j$ insulated from each other by $k$. Upon the sections or segments $i$ and $j$ continuously bear the brushes $m$ and $n$, respectively, connected, respectively, to the opposite terminals of the primary of the transformer T whose midpoint is connected to a terminal of a uni-directional or direct current source, for example, 1, 2, whose other terminal connects with the brush $o$ alternately engaging the contact members $i$ and $j$, thereby periodically reversing the current through the transformer primary with the result that an alternating electro-motive-force of frequency depending upon the speed of the motor M or shaft S is induced in the transformer secondary winding.

The current commutated by C induces in the circuit of the motor field winding K a current which is, in effect, rectified by the fork-controlled contacts $g$, $d$ and $e$, and the average magnitude of the control current again depends upon the phase relations between the fork vibrations and the commutated current whose frequency depends upon the speed of the motor M or shaft S.

A system generally similar to that of Figure 4 is shown in Fig. 5, in which the current from a source, as 1, 2, is commutated into an interrupted current by contacts $g$, $d$ and $e$ and passed through the primary winding of transformer T, causing an alternating electro-motive-force to be induced at brushes $m$, $n$ of commutator C, which in this case acts as a rectifier and passes a uni-directional control current through control winding K, now connected in series with brush $o$ of commutator C. The average magnitude of the rectified or control current is again dependent upon the phase relation between the vibrations of the fork F, acting as a source of alternating current, and the speed of the commutator C dependent upon the speed of motor M or shaft S.

The system of Fig. 6 maintains synchronism between or equality of speed of the shafts or systems S1 and S. If the shaft S1 rotates at constant speed, the motor M or shaft S will rotate at constant speed; or if the speed of the shaft S1 varies, that of the motor M or shaft S will similarly vary to maintain equality of speed or synchronism. In this case a second commutator C1 driven by the shaft S1 commutates current, as from the source 1, 2, into pulsating current which induces alternate current in the secondary of the transformer T, and this secondary current is commutated by the commutator C driven by the shaft S or motor M, effecting a uni-directional or rectified current in the field control winding K. The average magnitude of the control current again depends upon the phase relations between the current impulses, whose frequency depends upon the speed of the shaft S1, and the frequency of the commutator C which is dependent upon the speed of the motor M or shaft S.

Figure 7:
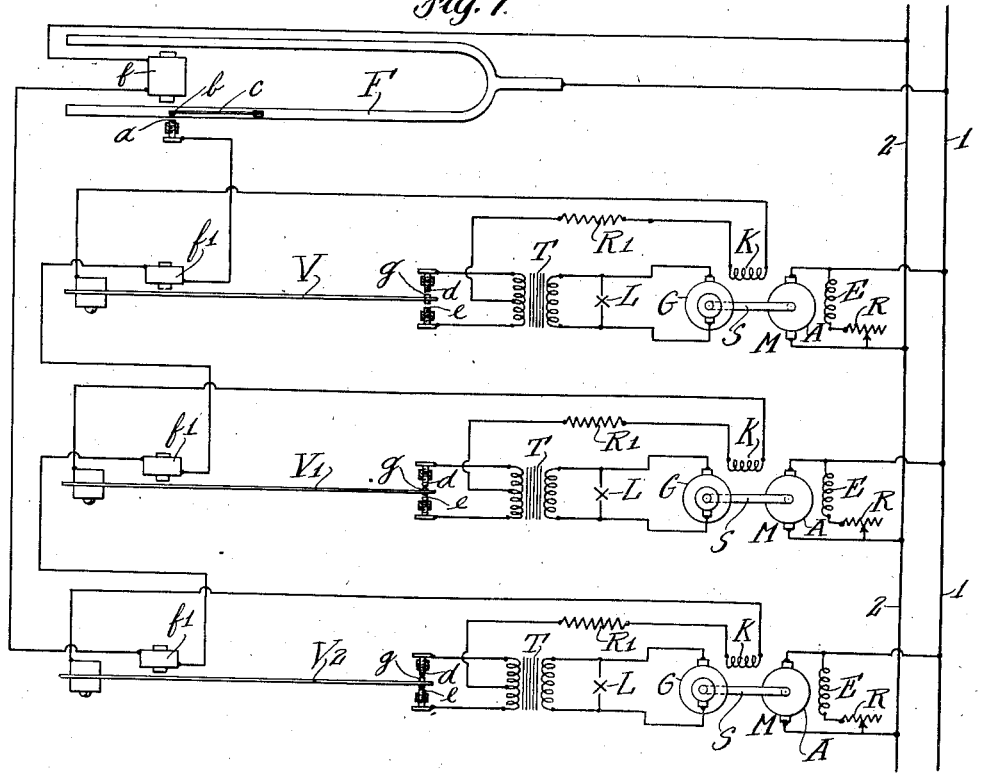

In Fig. 7 a plurality of systems is simultaneously maintained in synchronism or controlled as to their speeds by a single fork F. The systems are, for example, individually similar to that described in connection with Fig. 1. However, the fork F in this instance is a master vibrator controlling the periods of vibration of the control reeds or vibrators V, V1 and V2 of the individual systems by bringing into series with the master fork-vibrating magnet $f$ the coils $f1$ of the vibrating magnets for the reeds or members V, V1 and V2. Each of these reeds or controlled-vibrators carries a contact $g$ engaging alternately the contacts $d$ and $e$ which, as in Fig. 1, rectify the current delivered by each generator G and pass it through the field control winding K.

Figure 8:
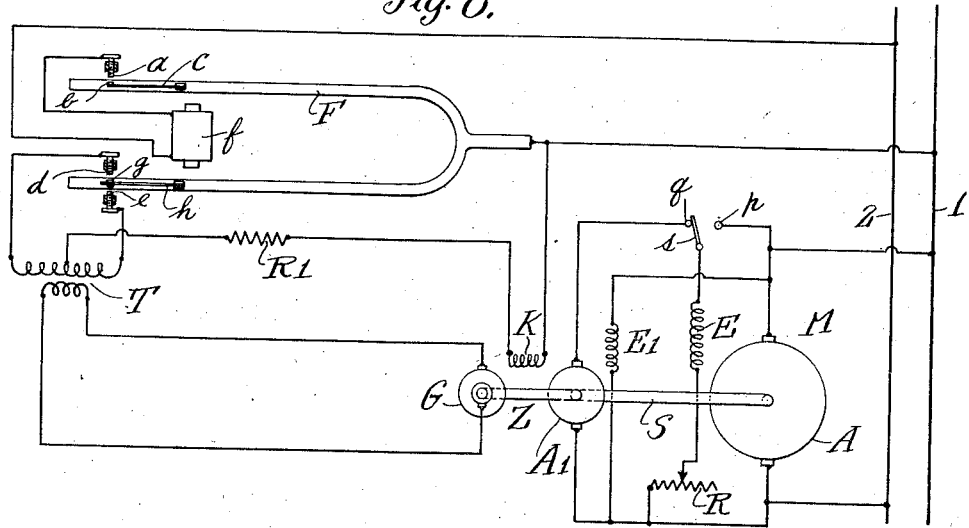

In Fig. 8 is disclosed a system by which it is possible to control the speed or synchronism of large motors or systems, as distinguished from the system above described which is applicable to motors or systems of limited size or power capacity because the amount of electric current that may be passed through and controlled by rapidly opening and closing contacts is limited by destructive arcing. This disadvantage is overcome by the arrangement in Fig. 8 in which the motor M is one of large power or capacity. The motor M or shaft S drives a rotary converter Z, of relatively small capacity, comprising direct current side or armature A1 with field winding E1, and the alternating current side G. The field control coil K in this instance affects the excitation of the field of the rotary converter, and more particularly cooperates with the field winding E1. In starting, the switch blade $s$ is thrown into contact with the switch point $p$, energizing the field E from the source 1, 2. The current through the armature A is gradually increased through a rheostat, not shown, as well-understood in the art. When the motor M is running at or near desired speed, the switch $s$ is thrown over onto the switch point $q$ in which case the field E is then energized by current from the direct current side A1 of the rotary converter Z. As the average amplitude of the control current in the winding K changes, occurring as described under conditions and for the purposes stated in connection with Fig. 1, the excitation of the field of the rotary converter Z is varied, increasing with increase of speed of the motor M and shaft S, and vice versa. As a result the voltage of the direct current side A1 of the rotary converter Z rises and falls as the speed of the motor and shaft S rises and falls, and, in consequence, the current through the main motor field rises and falls with increase and decrease of the speed of the large motor M. The principle is that described in connection with Fig. 1 in that increase of speed results in an increase of field excitation of the motor, causing it to decrease or tend to decrease in speed, and vice versa.

The arrangement of Fig. 8 is indirect, while that of Fig. 1 is direct. In Fig. 8 the exciting current of the field of the motor M is indirectly dependent upon the magnitude of the control current through the auxiliary field winding K of the rotary converter.

While the transformers T hereinbefore referred to have been shown as having separate primary and secondary circuits or windings, it will be understood that there may be used in lieu of each of them, as may be suitable or desirable, an auto transformer having a single winding operating, as is well-understood in the art, both as primary and secondary windings. And in lieu of a coupling of the transformer type any other well-known suitable type of coupling may be used between the two circuits involved.

The transformers may be of step-up or step-down types as may be suitable or desirable, or may have equal numbers of primary and secondary turns.

In some respects the systems hereinbefore described resemble that of Letters Patent 843,415 to Northrup of which it is characteristic that control is effected only when the motor or rotating system would, in the absence of control, run at a higher speed than desired. In my system, however, control may be effected when the motor or system has a speed of its own either greater or less than that corresponding with synchronism with the fork vibrations.

It is a further characteristic and advantage of my system that speed or synchronism is more rigidly maintained, in the sense that greater variations in load, voltage of the source driving the motor, or other respect may occur without destroying or departure from synchronism or critical speed.

It is further an important characteristic of my invention that the control current may be quite small, and much smaller than that of the Northrup system, with the result that the sparking and wear at the contacts controlling the control current are reduced, disturbance of the period or vibration of the fork is minimized and, in general, the accuracy and permanency of the synchronism or the speed control is improved.

While in the systems hereinbefore particularly described the control current is utilized for affecting the excitation of the field of a dynamo electric machine, it will be understood that it may be utilized in any other suitable way to affect or control the speed of the machine or system whose speed is to be controlled; for example, it may be used in addition in the ways indicated in Figs. 5 and 6 of my application, Serial No. 113,630, filed June 4, 1926.

What I claim is:

1. The method of controlling the relation to each other of the velocities of moving and vibratory systems, which comprises producing uni-directional current impulses succeeding each other at a frequency dependent upon the velocity of one of said systems, modifying the current impulses by an alternating electro-motive-force whose frequency is dependent solely upon the velocity of the other of said systems, and controlling the velocity of one of said systems by the current impulses so modified.

2. The method of controlling the speed of a moving system, which comprises producing in accordance with the vibrations of a vibratory member uni-directional current impulses succeeding each other at a frequency dependent upon the frequency of said vibrations, modifying the current impulses by an alternating electro-motive-force whose frequency is dependent solely upon the speed of the moving system, and controlling the speed of the moving system by the current impulses so modified.

3. The method of controlling the relation to each other of the velocities of an electric motor and vibratory member, which comprises producing uni-directional current impulses succeeding each other at a frequency dependent upon one of said velocities, modifying the current impulses by an alternating electro-motive-force whose frequency is dependent solely upon the other of said velocities, and controlling the field excitation of the motor by the current impulses so modified.

4. The method of controlling the speed of an electric motor, which comprises producing in accordance with the vibrations of a vibratory member uni-directional current impulses succeeding each other at a frequency dependent upon the frequency of said vibrations, modifying the current impulses by an alternating electro-motive-force whose frequency is dependent solely upon the speed of the motor, and controlling the field excitation of the motor by the current impulses so modified.

5. A system for controlling the relation to each other of the velocities of a moving system and a vibratory member whose period is independent of the velocity of said moving system, comprising means for effecting uni-directional current impulses succeeding each other at a frequency dependent upon one of said velocities, means for producing an alternating electro-motive-force whose frequency depends solely upon the other of said velocities, means for modifying said current impulses by said alternating electro-motive-force, and means for controlling the velocity of said moving system by the modified current impulses.

6. The combination with a system whose speed is to be controlled, of a vibratory member whose period is independent of the speed of said system, means controlled by said vibratory member for effecting uni-directional current impulses succeeding each other at a frequency dependent upon the frequency of the vibrations of said member, means for producing an alternating electro-motive-force whose frequency depends upon the speed of said system, means for modifying said current impulses by said alternating electro-motive-force, and means for controlling the speed of said system by the modified current impulses.

7. A system for controlling the relation to each other of the velocities of an electric motor and a vibratory member, comprising a source of current, means for producing from the current from said source uni-directional current impulses succeeding each other at a frequency dependent upon one of said velocities, means for producing an alternating electro-motive-force whose frequency is dependent solely upon the other of said velocities, means for modifying said current impulses by said electro-motive-force, and a field winding of said motor traversed by the modified current impulses.

8. The combination with an electric motor, of a vibratory member the frequency of whose vibrations is independent of the speed of said motor, a source of current, means controlled by said member for producing from the current from said source uni-directional current impulses succeeding each other at a frequency dependent upon the frequency of vibration of said member, means for producing an alternating electro-motive-force whose frequency is dependent upon the speed of said motor, means for modifying said current impulses by said electro-motive-force, and a field winding of said motor traversed by the modified current impulses.

9. The combination with a system whose speed is to be controlled, of a vibratory member the frequency of whose vibrations is independent of the speed of said system, a source of alternating electro-motive-force whose frequency is dependent upon the speed of said system, a transformer one circuit of which includes said source, means in the other circuit of said transformer controlled by said vibratory member for effecting in said other circuit uni-directional current impulses for controlling the speed of said system.

10. The combination with a system whose speed is to be controlled, of a vibratory member the frequency of whose vibrations is independent of the speed of said system, a source of alternating electro-motive-force whose frequency is dependent upon the speed of said system, a transformer one circuit of which includes said source, means in the other circuit of said transformer controlled by said vibratory member for effecting in said other circuit uni-directional current impulses, a second source of current in said other circuit of the transformer, said means controlled by said vibratory member effecting from the current from said second source uni-directional current impulses, and means for controlling the speed of said system by the current in said other transformer circuit.

11. A system for controlling the relation to each other of the magnitudes of the velocities of a moving system and a vibratory member the frequency of whose vibrations is independent of the velocity of said moving system, comprising a source of alternating electro-motive-force whose frequency is dependent upon one of said velocities, means for effecting uni-directional current impulses from said electro-motive-force in accordance with the other of said velocities, a second source of current, said last-named means effecting from said second source of current uni-directional current impulses, and means for controlling the velocity of said moving system by a current resulting from the several current impulses.

12. The method of controlling the velocity of a moving system, which comprises producing a control velocity independently thereof, producing an alternating current whose frequency is dependent upon one of said velocities, producing uni-directional current whose magnitude is determined by the relation of said velocities and whose direction of flow is independent thereof by rectifying said current in accordance with the other of said velocities, and controlling the velocity of said moving system by the resultant uni-directional current.

13. The method of controlling the velocity of a moving system, which comprises producing a control velocity independently thereof, producing an alternating current whose frequency is dependent upon the speed of said moving system, producing unidirectional current whose magnitude is determined by the relation of said velocities and whose direction of flow is independent thereof by rectifying said current in accordance with the control velocity, and controlling the velocity of said moving system by the resultant uni-directional current.

14. The method of controlling the velocity of an electric motor, which comprises producing a control velocity independently thereof, producing an alternating current whose frequency is dependent upon one of said velocities, producing uni-directional current whose magnitude is determined by the relation of said velocities and whose direction of flow is independent thereof, and controlling the field excitation of said motor by said uni-directional current.

15. The combination with an electro-dynamic machine, of means producing an alternating current whose frequency depends upon the speed of said machine, a transformer having a winding in circuit with said means, a vibratory member carrying a contact, a pair of contacts alternately engaged by said contact and connected to terminals of another winding of said transformer, and a field winding for said machine in circuit with said first contact and an intermediate terminal of said other transformer winding.

NORMAN E. BONN.